United States Patent Office 3,403,974
Patented Oct. 1, 1968

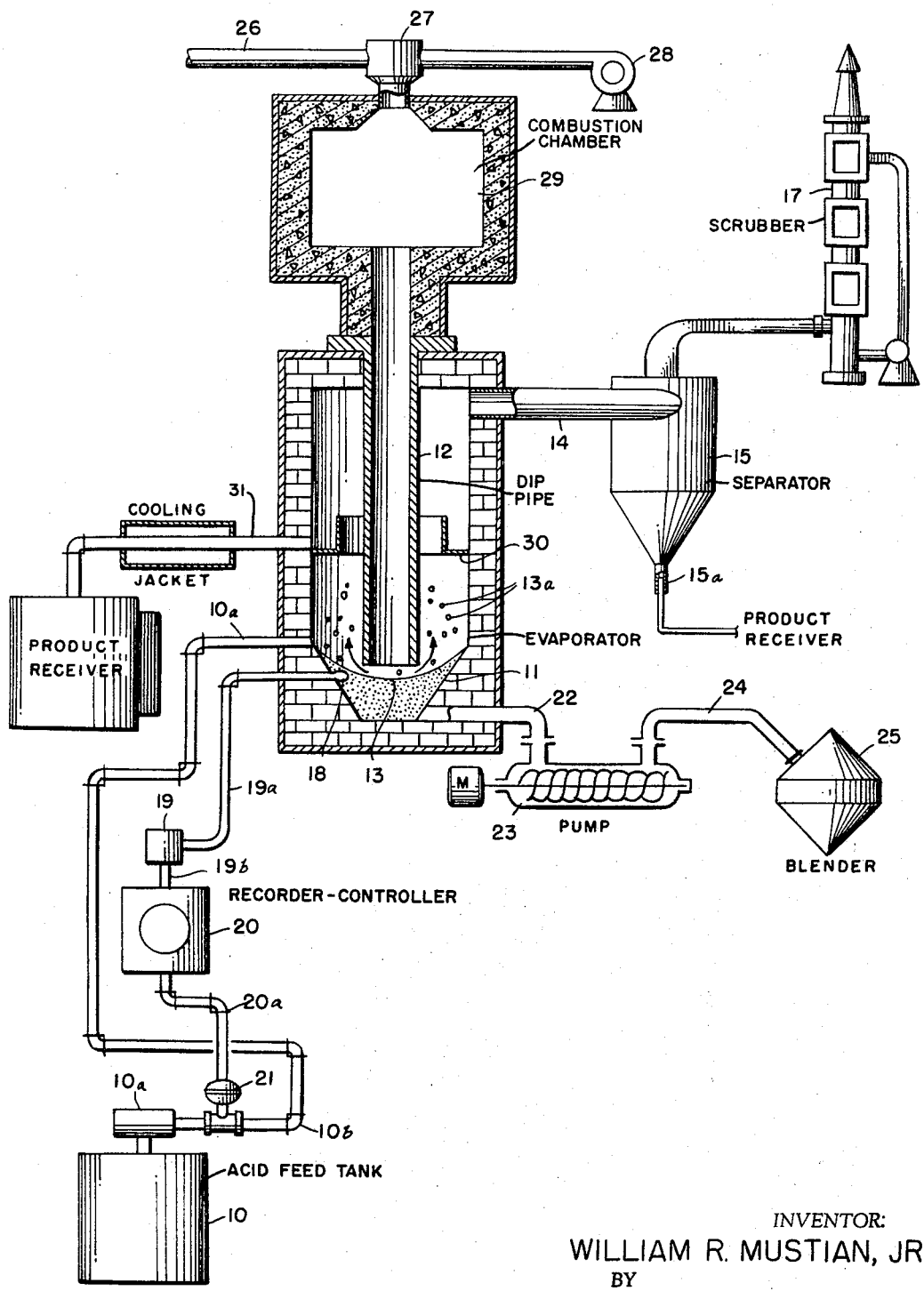

3,403,974
METHOD AND APPARATUS FOR CONCENTRATING PHOSPHORIC ACIDS CONTAINING IMPURITIES
William R. Mustian, Jr., Lakeland, Fla., assignor to Armour Agricultural Chemical Company, a corporation of Delaware
Filed Mar. 25, 1964, Ser. No. 354,669
10 Claims. (Cl. 23—165)

ABSTRACT OF THE DISCLOSURE

Wet process orthophosphoric acid containing metal impurities is heated with high velocity combustion gases to form cyclic metaphosphoric acid and other poly acids which form polymer complexes with said impurities, while phosphoric acid droplets substantially free of the complexes are entrained with the gases and recovered therefrom as the gases are withdrawn. Continued heating of the acid at temperatures in the range of 650–1000° F. convert the excess cyclic acids to acyclic phosphoric acids.

---

This invention relates to method and apparatus for concentrating phosphoric acids containing impurities, and more particularly to the concentration of wet process phosphoric acids containing metal salts and other impurities.

Wet process phosphoric acids contain from about one to fifteen percent of metal impurities and also other impurities, and such impurities have for many decades constituted the main problem in dealing with such phosphoric acids. The presence of impurities in the product makes it unsuitable for high grade phosphate use and for use in detergents so that the product cannot compete with furnace acid in such areas and in other areas. Further, when the product is concentrated by the removal of water to a relatively high degree, metaphosphoric acid is formed and this acid fraction combines with the metal oxides to form salts which settle out and form undesirable solids in the product. Hence, in the preparation of phosphoric acids, the workers in this field have been warned to maintain lower temperatures at which metaphosphoric acid fractions are not formed in order to prevent a deposition of solids.

I have discovered that high purity phosphoric acids can be prepared which are useful as food grade phosphates and detergents and which can successfully compete with furnace acids in these and other areas, while at the same time concentrating the metal salts and other impurities in a small fraction which may be recovered separately as a useful fertilizer product. Further, I have discovered that this can be accomplished in the concentrating operation itself so that no separate operation is required for the recovery of the high purity product and the recovery of the residue fertilizer product. I have discovered further that high temperatures which are desirable for obtaining highly concentrated phosphoric acid products can be employed and that the formation of a fraction of metaphosphoric acid in the operation is actually beneficial for the removal of the impurities in a continuous process. In effect, the new process separates the impurities during the dehydration operation so that lighter phosphoric acid fractions may be drawn off which are relatively free of the impurities while the impurities are being concentrated in a heavy residue fraction which also may be withdrawn as a separate product.

An object of this invention, therefore, is to overcome the difficulties above described and to bring about the new results which have been set forth. A further object is to provide a method and means for concentrating wet process phosphoric acids containing impurities, while recovering separately phosphoric acids containing relatively little of the impurities and a phosphoric acid heavy residue fraction containing the bulk of the impurities. Yet another object is to provide apparatus in which a phosphoric acid fraction is recovered in the vapor space of the dehydrator so that the fraction may be recovered as a product which is relatively free from impurities. Yet another object is to provide a method and means for the continuous dehydration of phosphoric acids containing impurities under conditions which cause the metal oxides and other impurities to react and form phosphates producing a heavy residue which may be separately recovered. Other specific objects and advantages will appear as the specification proceeds.

The invention is shown, in an illustrative embodiment, by the accompanying drawing, in which:

The figure is a side view in elevation, and partly in section, of apparatus which embodies my invention and in which the invention may be carried out.

In one embodiment of my invention, wet process phosphoric acid is supplied to an evaporator to provide a pool therein, and gaseous products of combustion are directed upon the acid pool to heat the same to a vaporizing temperature. The pool temperature is maintained preferably by regulating the feed rate of fresh acid into the pool. The stream of hot gases employed to heat the acid pool has a velocity which not only heats the pool but carries droplets of acid upwardly in the evaporator, and I provide above the pool a collector vessel or ring which receives droplets of acid at an elevated point above the pool, and such acid is recovered through a draw-off pipe as product. Near the upper portion of the dehydrator, the combustion gas and water vapor and an entrained portion of acid may be drawn off and the acid fraction recovered. The metal and other impurities react with a phosphoric acid fraction and form a heavy residue in the liquid pool and are withdrawn separately as a product.

As a specific illustration and referring more particularly to the drawing, phosphoric acid preferably of the range 27 to 64 weight percent phosphorus calculated as $P_2O_5$ equivalent is pumped from feed tank 10 by pump 10a through pipe 10b to evaporator 11, forming a pool in the frustoconical portion of the evaporator 11. The hot gases are directed through the dip pipe 12 to the lower portion of the reaction chamber. If desired, the gases may be introduced into the body of the liquid for submerged heating, or the hot gases may be delivered to a higher velocity to engage the liquid acids in the pool at the bottom of the evaporator, depressing the level of the liquid, as indicated best by the numeral 13. In either event, whether the gas is discharged while the pipe 12 extends into the body of the pool or whether the pipe 12 is spaced from the pool, the high velocity gases blow droplets 13a of acid upwardly through the column of the dehydrator and toward the elevated gas withdrawal pipe 14.

The moisture-laden gases which disengage from the acid in the space above the evaporator bottom are removed by the duct 14 to the separator 15. Entrained acid droplets removed in the separator 15 are recovered as a separate product through pipe 15a. The gases continue to the floating bed scrubber 17, where condensable and water-soluble pollutants are removed.

The temperature of the liquid acids within the reaction chamber is maintained at a substantially constant value by a control circuit. The filled bulb 18 communicates with the pneumatic transmitter 19 through conduit 19a, and the pressure transmitter 19 communicates similarly through conduit 19b with a recorder-controller 20 which is pre-set to the desired temperature and which pneumatically operates through conduit 20a the diaphragm control valve 21 in the feed acid line 10b. In operation, the filled bulb 18 senses the acid temperature and records the same by means of transmitter 19 with recorder-controller 20 which is pre-set to the desired temperature, the signal from the bulb to the transmitter being by pressure through the gas-filled conduit 19a. The recorder-controller in operation adjusts the diaphragm control valve 21 so as to increase or decrease the amount of feed as required to maintain the acid at predetermined temperature. The effect of this system is to decrease the feed rate with increasing water content of the feed acid, and to increase the feed rate when the water content of the acid decreases.

Liquid product material containing the impurities may be withdrawn from the lower portion of the evaporator 11 by a gear or diaphragm pump 23 and passed through pipe 24 to the blender 25, or other processing equipment.

A fuel gas, such as propane, is fed through conduit 26 under the desired pressure to the burner 27 where it is mixed with air (preferably an excess of air) from blower 28. Combustion takes place within the chamber 29, and the combustion gases are delivered through the dip pipe 12, as heretofore described. If desired, control elements, such as are shown in my copending application Ser. No. 265,200, filed Mar. 14, 1963, may be employed for maintaining a substantially constant rate of fuel gas input. Such control apparatus, however, need not be employed because of the advantages flowing from the increased velocities of the pipe 12 which serve to space the bottom end of the pipe from the liquid acid level.

In the practice of my invention, I secure within the vapor space of the dehydrator above the pool and above the feed line 10b, a pan or tray 30 for collecting droplets 13a of acid, and a pipe 31 extending between the tray 30 and the outside of the dehydrator provides a means for recovering this product substantially free from impurities. The tray may be of any suitable shape or size. I prefer to employ an annular tray or ring receptacle 30.

In the structure shown and by way of illustration, a volume of 10 gallons is provided by the frusto-conical bottom portion of the evaporator in which the cone is 10 inches high, with a diameter of 23 inches at the top of the cone, and with the liquid draw-off pipe 22 at a point about even with the flat bottom of the evaporator. The median pool cross-sectional area (226.9 sq. in.) bears with the cross-sectional area of the dip pipe 12 (28.3 sq. in.) the ratio of about 8 to 1. I prefer that the median pool cross-sectional area should bear a ratio to the cross-sectional area of the dip pipe of at least 5.5 to 1. Gas velocities of about 1200 to 1500 feet per minute and at temperatures of from 1500° to 1900° F. are useful in heating the acid pool and in causing acid droplets to rise with the current of exhaust gases. The rising droplets are found to contain less of the impurities, and the elevated annular tray 30 is found to collect a product relatively free of the impurities.

There are critical proportions which make the difference between liquid being pressed away from the bottom of the dip pipe and the dip pipe being submerged. Considering the cross-sectional annular area between the bottom of the dip pipe and the adjacent nearest point of the evaporator 11, I find that the ratio of the dip pipe gas velocity to this annulus cross-section should be about 7.1 feet per minute as the velocity to the area of the cross-section in square inches.

For example, with a dip pipe velocity of 1414 feet per minute and with the annulus cross-section area of 200 inches, the ratio may be determined as follows:

$$\frac{\text{Ratio Dip Pipe Velocity (ft./min.)}}{\text{Annulus Cross-Section (in.}^2\text{)}} =$$

$$\frac{1414 \text{ ft./min.}}{200 \text{ in.}^2} = 7.1 \text{ ft./min./in.}^2$$

The ratio may also be expressed in terms of cubic feet per hour velocity to the area of annulus in square inches as follows:

$$\frac{\text{Ratio Comb. Gas Volume (scfh)}}{\text{Annulus Cross-Section (in.}^2\text{)}} =$$

$$\frac{21240}{200} = 106 \text{ ft.}^3/\text{hr./in.}^2$$

The values expressed in these two ratios are those which bring out the condition of displacing the liquid from the bottom of the dip pipe.

If these rates of gas flow are decreased by the order of 10 to 15 percent, no longer will the liquid be removed from the bottom of the dip pipe and the operation will revert to submerged dip pipe conditions. If the gas input or velocity is raised above 10 to 15 percent, successful results can be obtained, but the efficiency of the operation will be decreased. Variations of 2 to 3 percent of the values of these two ratios may also be expected with changes in feed composition, the percent of $SO_3$ in the feed, and also with the desired product composition as to $P_2O_5$ concentration.

I employ gas stream velocities which are sufficient to cause acid droplets to be carried upwardly from the pool and I prefer velocities which press away the liquid from the bottom of the dip pipe.

The pool temperatures may vary from 400° to 750° F. or higher, if desired, and depending upon the final product to be prepared. For the fractionation of impurities and the concentration of the impurities in the heavy liquid residue at the bottom of vessel 11, I prefer to employ high temperatures which will produce at least a fraction of metaphosphoric acid so that the metaphosphoric groups may combine with all of the metals and the impurities in the acids being treated so that the impurities may be physically separated from the pure product. I find that at the high temperatures, the metaphosphoric groups, and other polyphosphoric groups, form polymers with the impurities, such as aluminum and iron, and these because they are heavier tend to find their way into the pool below, forming a heavy residue material therein. I find that these poly acids effectively unite with the iron and aluminum at about 650° up to 1000° F. or higher, and while a wider range of temperatures may be employed, I prefer a temperature within the range of 680° to 710° F.

In the practice of my invention, a high purity phosphoric acid product may be obtained from the overhead pipe 14 and separated from the combustion gases in cyclone separator 15. A purified product may also be obtained through pipe 31 leading from the annular collector vessel 30. The heavy residue concentrated in the pool 13 may be withdrawn as a product through pipe 22 by means of the pump 23, communicating with the bottom of the pool 13.

By the above procedure, I find that about 92 to 95 percent of the $P_2O_5$ content of the phosphoric acid feed can be recovered as liquid through the outlets 15a and 31, while the remaining 5 to 8 percent of the $P_2O_5$ content of the feed is recovered with the impurities in the heavy residue withdrawn from vessel 11. By way of example, one can produce in the apparatus shown a wet process acid in excess of 80 percent $P_2O_5$, with solids of about 0.1 percent, citrate insoluble about 0.05 percent, $Fe_2O_3$ about 0.3 percent, and $Al_2O_3$ about 0.3 percent, this product being produced from a wet process feed of 54.7 percent $P_2O_5$ containing 1.9 percent $Al_2O_3$ and 1.23 percent $Fe_2O_3$.

While in the foregoing description I have referred to a specific type of apparatus having specific proportions, it will be understood that the operation can be carried out in different forms of apparatus having quite different proportions, the combustion gases being introduced in different ways to contact the phosphoric acid, and the liquid products being withdrawn in a different manner.

A specific detailed example, illustrative of the process, may be set out as follows:

Example I

In a 10-gallon dehydrator equipped with a collector tray 30, 54 percent wet process phosphoric acid was introduced into the chamber 11 at a feed rate of 1.6 gallons per minute. The products of combustion were discharged through dip pipe 12 at a velocity of 1414 feet per minute. The acid pool was maintained at a temperature of about 690° F. The average retention time in the evaporator was about 8 minutes. The product withdrawal rate was about 0.9 gallon per minute. The temperature of the effluent liquid product was about 640° F. The moisture-laden gases which disengaged in the space above the acid pool were at about 765° F. and were removed through a duct to the cyclone separator 15, as shown in the drawing. The collector cup had a ½ gallon volume. Samples were collected, as shown in the following table which indicates the composition of the feed and in which the liquid product withdrawn through pipe 22 is indicated by "PRD" and the acid product withdrawn through pipe 14 with the gases to cyclone 1t is indicated by the letters "Cy," and the product recovered from tray 30 is indicated by the work "Cup."

| Sample | Percent $P_2O_5$ | Percent $H_2O$ Insols | Percent $Al_2O_3$ | Percent $Al_2O_3$ $P_2O_5$ basis | Percent $Fe_2O_3$ | Percent $Fe_2O_3$ $P_2O_5$ basis |
|---|---|---|---|---|---|---|
| Feed | 54.7 | 0.54 | 1.19 | 2.2 | 1.23 | 2.2 |
| PRD | 81.1 | 5.94 | 1.75 | 2.2 | 1.63 | 2.0 |
| PRD | 80.5 | 8.84 | 2.23 | 2.8 | 1.89 | 2.3 |
| PRD | 81.0 | 7.53 | 1.64 | 2.0 | 1.64 | 2.0 |
| PRD | 81.3 | 6.74 | 1.58 | 2.0 | 1.66 | 2.0 |
| Cup | 81.7 | 0.06 | 0.36 | 0.44 | 0.33 | 0.4 |
| Cup | 80.6 | 0.15 | | | 0.33 | 0.4 |
| Cup | 80.0 | 0.08 | 0.21 | 0.26 | 0.28 | 0.33 |
| Cy | 81.7 | 0.60 | 0.22 | 0.26 | 0.32 | 0.4 |
| Cy | 81.3 | 0.35 | 0.22 | 0.26 | 0.26 | 0.33 |

As shown from the above samples, the product recovered from the cup and from the cyclone is relatively free of impurities, while the product recovered through the pipe 22 contains impurities in excess of those found in the feed, thus showing a concentration of impurities in the residue material withdrawn from the pool.

In the above-described example, there is a precipitation of substantially all metallic cations as phosphates so that the acid products withdrawn at elevated points from the vapor space are relatively free of impurities. At the same time, the concentrated residue is of definite value as a fertilizer product. Further, the above valuable products, one useful as food grade phosphates and detergent and the other as a fertilizer product, are produced in the single operation which is necessary and essential for the concentration of the phosphoric acid and require no additional treatment steps. A further important advantage is that extremely high temperatures can now be employed for producing desired poly acids without fear of the metaphosphoric acid fraction.

While I cannot state with certainty why in the concentration operation there is a progressive movement of concentrated acid having relatively little impurities toward the elevated points of withdrawal and a progressive movement of the impurities and acid reacted therewith toward the bottom of the pool, it may be that the following is an explanation: The acid drops which are borne upwardly by the gas currents contain impurities which, because they are heavier, move downwardly into the lower portion of each drop, and the drop tends to break in two, with the lighter drop fragment free of impurities moving upwardly within the air current and the heavier drop fragment containing the impurities moving downwardly against the current. In effect, the breaking up of the acid into drops and droplets and the fragmenting of the drops enable levitation forces to raise the droplets freed of heavy metal impurities, while the droplets containing heavy metals move progressively downwardly. Such separation is made effective by the presence of the metaphosphoric groups combining with the metals, as heretofore described. While a mechanical separation may be effected by levitation or entrainment employing rising gas currents, it should be possible also to effect such separation through other means.

Example II

The process was carried out as described in Example I to obtain a "cup" and "cy" product which was 79 weight percent $P_2O_5$ acid (total composition basis). An analysis of the acid was made to determine the polymer distribution, with the following results:

| | 79% $P_2O_5$ Acid |
|---|---|
| Ortho | 5 |
| Pyro | 30 |
| Tripoly | 35 |
| Tetrapoly | 10 |
| Pentapoly | 5 |
| Higher | 15 |

It will be noted from the above analysis that no metaphosphoric acid was found in the final product. While the cyclic (e.g., meta) acid was produced in the process, this fraction reacted with the metal salts and formed cyclic complexes which were collected in the pool at the bottom of the reaction zone. The excess cyclic above that required to react with the metal impurities may be converted to higher analysis acyclic poly acids. Thus, in a progressive concentration operation, ortho may be converted to acyclic and to cyclic, a portion of the cyclic reacting with the metal impurities present and the excess cyclic in the same operation being converted to higher acyclic poly acid forms. In any event, the final product consists predominantly of acyclic polyphosphoric acids, with well over 50 percent of the product in the acyclic form. Best results have been obtained when the poly acids (acyclic) constitute more than 70 percent and preferably more than 80 percent of the $P_2O_5$ in the product.

One factor of great importance is that the concentrated high analysis product remains concentrated during the separation from the metal complexes and is available for formulating new high analysis fertilizer compositions. The separation of the metal impurities is accomplished during the concentration operation, and the metal impurity complexes are separately recovered as a useful fertilizer product.

While in the foregoing specification I have set forth specific structure and specific process steps in considerable detail for the purpose of illustrating my invention, it will be understood that such detail or details may be varied widely by those skilled in the art without departing from the spirit of my invention.

I claim:

1. An apparatus for concentrating wet process phosphoric acid containing metal impurities, a dehydrator providing a reaction chamber adapted to maintain a pool of acid and a vapor space thereabove, means for introducing acid into said dehydrator, means including a vertical dip pipe for introducing hot combustion gases into said dehydrator and into contact with said acid pool at a velocity which carries acid droplets into said vapor space, leaving residue in said pool, means for withdrawing gas and vapors from the upper portion of said dehydrator, means for withdrawing residue from said pool, a collector vessel supported out of the line of flow of said gases and within the vapor space of said dehydrator below said gas and vapor withdrawal means for receiving acid droplets carried into said vapor space, and a product recovery duct leading from said vessel to a point outside of said dehydrator.

2. The apparatus of claim 1 in which said vessel is an annular tray.

3. In apparatus for concentrating phosphoric acid containing metal impurities, a dehydrator providing a reaction chamber adapted to maintain a pool of phosphoric acid and to provide a confined vapor space thereabove, means for introducing phosphoric acid into said dehydrator means including a vertical lip pipe for introducing hot combustion gases into said dehydrator and into contact with said acid pool at a velocity which carries entrained acid droplets into said vapor space, leaving residue in said pool, means for withdrawing gas and vapors and entrained acid droplets from the upper portion of said dehydrator, separator means for removing acid droplets from said withdrawn vapors, means for withdrawing residue from said pool, a collector vessel supported out of the line of flow of said gases and within the vapor space of said dehydrator below said gas and vapor withdrawal means for receiving acid droplets carried into said vapor space, and a product recovery duct leading from said vessel to a point outside of said dehydrator.

4. In a process for treating wet process orthophosphoric acids containing metal impurities to separate the bulk of said impurities, the steps of impinging hot combustion gases upon said orthophosphoric acids in a reaction zone to heat the same to about 680–710° F. to convert in excess of 80 percent of the $P_2O_5$ of said orthophosphoric acids to the poly form and to remove water vapor and to form concentrated phosphoric acids including a metaphosphoric acid fraction which reacts with said metal impurities to form a heavy metal phosphate residue, withdrawing gases and vapor from the upper portion of said zone together with entrained acid droplets, collecting said droplets within the vapor space of said zone but outside the path of flow of said gases, and recovering the products of reaction of said metaphosphoric acid and metal impurities from the lower portion of said zone.

5. In a process for treating wet process orthophosphoric acids containing metal impurities, the steps of impinging high velocity hot combustion gases upon said orthophosphoric acids in a reaction zone to heat the same to about 650–1000° F. to remove water vapor and to form concentrated phosphoric acid containing in excess of 70 percent of the $P_2O_5$ of said orthophosphoric acid in the poly form and including a cyclic phosphoric acid fraction which reacts with said metal impurities to form cyclic metal complexes, withdrawing gases and vapor from the upper portion of said zone, collecting acid droplets entrained with said high velocity gases outside the path of the flow of said gases and recovering the same substantially free of said cyclic metal complexes, continuing to heat the unreacted cyclic acids to convert them to acyclic form, and withdrawing the products of reaction of said cyclic acid and metal impurities from the lower portion of said zone substantially free of said cyclic acid.

6. The process of claim 5 in which in excess of 80 percent of the $P_2O_5$ of said orthophosphoric acids is converted to the poly form.

7. The process of claim 5 in which said orthophosphoric acid is heated to about 680–710° F.

8. In the process for treating wet process orthophosphoric acids containing metal impurities, the steps of impinging high velocity hot combustion gases upon said orthophosphoric acids to heat the same to about 650–1000° F. in a reaction zone to entrain acid droplets and to convert in excess of 70 percent of the $P_2O_5$ of said orthophosphoric acids to the poly form and including a cyclic phosphoric acid fraction which reacts with said metal impurities to form cyclic metal complexes, withdrawing gases and vapor from the upper portion of said zone, collecting within the vapor space of said zone but outside the path of flow of said gases said entrained acid droplets carried by said high velocity combustion gases, withdrawing said droplets substantially free of cyclic metal complexes, and collecting the products of reaction of said cyclic phosphoric acid and metal impurities in the lower portion of said zone.

9. In a process for concentrating wet process orthophosphoric acids containing metal impurities, the steps of feeding said wet process orthophosphoric acids into a reaction zone to form a pool therein, contacting said wet process orthophosphoric acids with a high velocity vertical stream of hot combustion gases to heat said acids to dehydrating temperatures and to entrain droplets of said acids into the vapor space in said zone communicating with said pool while depositing a residue in said pool, collecting entrained acids in said vapor space outside the path of flow of said gases withdrawing gas and vapors from the upper portion of said zone, withdrawing said residue from said pool, and separately withdrawing said collected acids.

10. The process of claim 9 in which said orthophosphoric acids are heated within the range of about 400–750° F. to convert at least a portion of the orthophosphoric acids to cyclic acids for forming metal phosphate complexes.

References Cited
UNITED STATES PATENTS

| | | | |
|---|---|---|---|
| 3,316,061 | 4/1967 | Csendes et al. | 23—165 |
| 1,264,509 | 4/1918 | Hechenbleikner | 23—275 |
| 1,924,919 | 8/1933 | Flowers. | |
| 2,338,408 | 1/1944 | Coleman et al. | 23—165 |
| 2,830,882 | 4/1958 | Rheuby | 23—276 |
| 2,962,357 | 11/1960 | Williams et al. | 23—165 |
| 3,057,711 | 10/1962 | Reusser | 71—43 |
| 3,104,947 | 9/1963 | Switzer et al. | 23—165 |
| 3,192,013 | 6/1965 | Young | 23—165 |
| 3,193,350 | 7/1965 | Beltz et al. | 23—165 |
| 3,266,557 | 8/1966 | Mustian et al. | 159—16 |
| 3,279,526 | 10/1966 | Mustian | 159—47 |

OSCAR R. VERTIZ, *Primary Examiner.*

A. J. GREIF, *Assistant Examiner.*